(12) United States Patent
Yamauchi

(10) Patent No.: US 11,262,682 B2
(45) Date of Patent: Mar. 1, 2022

(54) IMAGE FORMING SYSTEM AND IMAGE FORMING METHOD

(71) Applicant: Konica Minolta, Inc., Tokyo (JP)

(72) Inventor: Yuki Yamauchi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 343 days.

(21) Appl. No.: 15/712,932

(22) Filed: Sep. 22, 2017

(65) Prior Publication Data

US 2018/0088503 A1    Mar. 29, 2018

(30) Foreign Application Priority Data

Sep. 23, 2016 (JP) .............................. JP2016-185699

(51) Int. Cl.
| | |
|---|---|
| *G03G 15/00* | (2006.01) |
| *B65H 85/00* | (2006.01) |
| *G03G 15/23* | (2006.01) |
| *B65H 5/26* | (2006.01) |
| *B65H 3/44* | (2006.01) |
| *B65H 7/20* | (2006.01) |
| *H04N 1/00* | (2006.01) |

(52) U.S. Cl.
CPC ............. *G03G 15/234* (2013.01); *B65H 3/44* (2013.01); *B65H 5/26* (2013.01); *B65H 7/20* (2013.01); *B65H 85/00* (2013.01); *G03G 15/6514* (2013.01); *H04N 1/00575* (2013.01); *B65H 2301/33312* (2013.01); *B65H 2405/15* (2013.01); *B65H 2405/332* (2013.01); *B65H 2407/21* (2013.01); *B65H 2511/11* (2013.01); *B65H 2511/40* (2013.01); *B65H 2511/414* (2013.01); *B65H 2513/42* (2013.01); *B65H 2551/18* (2013.01); *B65H 2551/212* (2013.01); *B65H 2551/26* (2013.01); *G03G 15/6511* (2013.01)

(58) Field of Classification Search
CPC ...... B65H 85/00; B65H 7/20; B65H 2511/40; B65H 2511/11; B65H 2407/21; B65H 2551/18; B65H 2551/212; B65H 2551/20; G03G 15/23; G03G 15/231; G03G 15/232; G03G 15/234; G03G 15/6573; G03G 15/6579; H04N 1/00575
See application file for complete search history.

(56) References Cited

U.S. PATENT DOCUMENTS

| | | | |
|---|---|---|---|
| 6,470,169 B2 * | 10/2002 | Nakazato | G03G 15/234 399/388 |
| 6,615,018 B2 * | 9/2003 | Funato | G03G 15/20 399/322 |

(Continued)

FOREIGN PATENT DOCUMENTS

JP    2015025911 A    2/2015

*Primary Examiner* — Luis A Gonzalez
(74) *Attorney, Agent, or Firm* — Cantor Colburn LLP

(57) ABSTRACT

In an image forming system, a hardware processor controls whether the first sheet is conveyed to an upstream side of the image former via a first conveying path which reverses sides of the first sheet or via a second conveying path which does not reverse the sides of the first sheet as well as the first conveying path, when images are formed on both sides of a plurality of the first sheets by the image former, in order to narrow a space between a plurality of the first sheets.

11 Claims, 10 Drawing Sheets

(56) References Cited

U.S. PATENT DOCUMENTS

| | | | |
|---|---|---|---|
| 6,778,787 B2* | 8/2004 | Kinoshita | G03G 15/234 |
| | | | 399/16 |
| 6,782,236 B2* | 8/2004 | Sasaki | G03G 15/234 |
| | | | 271/184 |
| 7,775,619 B2* | 8/2010 | Kawabata | B41J 3/60 |
| | | | 347/104 |
| 9,274,475 B2* | 3/2016 | Matsumoto | G03G 15/234 |
| 10,088,792 B2* | 10/2018 | Shiokawa | B65H 85/00 |
| 2017/0242389 A1* | 8/2017 | Asakawa | G03G 15/70 |

* cited by examiner

IMAGE FORMING SYSTEM AND IMAGE FORMING METHOD

CROSS REFERENCE TO RELATED APPLICATIONS

The present invention claims priority under 35 U.S.C. § 119 to Japanese Patent Application No. 2016-185699 filed on Sep. 23, 2016, the entire content of which are incorporated herein by reference.

BACKGROUND

Technological Field

The present invention relates to an image forming system and an image forming method.

Description of Related Art

In image forming apparatuses, images are sometimes formed on so-called long sheets. Long sheets herein refer to sheets (cut sheets) long in a predetermined direction and different from commonly used cut sheets of A4 size and A3 size, for example. Images are formed on such long sheets by placing long sheets in a manual sheet feed tray since they cannot be stored in a typical sheet feed tray, or using a sheet feeding device equipped with a sheet cassette designed for long sheets, which is larger than a typical one.

In recent years, there is growing demand for duplex printing of such long sheets through reversing sides thereof inside an image forming apparatus (inside the housing). In this case, there are a technical challenge in how to secure enough space for reversing sides of the long sheets inside the image forming apparatus as well as a problem in which the apparatus tends to become larger.

Japanese Patent Application Laid-Open No. 2015-25911 (hereinafter, "Patent Literature (PTL)" 1) discloses a configuration in which duplex printing of long sheets is achieved without increasing size of an image forming apparatus body by providing space, to which a reversed long sheet is evacuated temporarily, in an optional unit that is used by being connected with the image forming apparatus body.

Although the technique disclosed in PTL 1 can avoid increase in size of the image forming apparatus body, the technique cannot perform printing on the following sheet during reversal of a sheet, and thus intervals between sheets need to be lengthen greatly. Further, the technique disclosed in PTL 1 has a problem in which longer sheets result in longer intervals between sheets, thereby significantly lowering productivity in printing. In particular, this point is deemed serious in a recent image forming apparatus in which high productivity in high-volume printing is desired.

SUMMARY

An object of the present invention is to provide an image forming system and an image forming method that can prevent lowering in productivity in duplex printing of a long sheet.

To achieve at least one of the abovementioned objects, according to an aspect of the present invention, an image forming system reflecting one aspect of the present invention including a sheet feeder that feeds a first sheet with a length in a conveying direction equal to or longer than a predetermined length and a second sheet with a length in the conveying direction shorter than the predetermined length, and an image forming apparatus including an image former that forms an image on the first sheet or the second sheet which is fed by the sheet feeder, includes: a first conveying path that is provided inside the sheet feeder and the image forming apparatus, and that receives the first sheet on a downstream side of the image former in the conveying direction of the first sheet, reverses sides of the first sheet, and conveys the first sheet to an upstream side of the image former; a second conveying path that is provided inside the sheet feeder and the image forming apparatus, and that receives the first sheet on the downstream side of the image former in the conveying direction of the first sheet and conveys the first sheet to the first conveying path without reversing the sides of the first sheet; and a hardware processor that controls whether the first sheet is conveyed to the upstream side of the image former via the first conveying path or via the second and the first conveying paths, when images are formed on both sides of a plurality of the first sheets by the image former, in order to narrow a space between a plurality of the first sheets.

An image forming method reflecting another aspect of the present invention using a sheet feeder that feeds a first sheet with a length in a conveying direction equal to or longer than a predetermined length and a second sheet with a length shorter than the predetermined length, and using an image forming apparatus including an image former that forms an image on the first sheet or the second sheet which is fed by the sheet feeder, includes: when images are formed on both sides of a plurality of the first sheets by the image former, in order to narrow a space between a plurality of the first sheets, controlling whether the first sheet is conveyed to an upstream side of the image former via a first conveying path that receives the first sheet on a downstream side of the image former in a conveying direction of the first sheet and reverses sides of the first sheet, or via a second conveying path that receives the first sheet on the downstream side of the image former in the conveying direction of the first sheet and conveys the first sheet to the first conveying path without reversing the sides of the first sheet, as well as the first conveying path.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

In the following, embodiments of an image forming system of the present invention will be described in detail with reference to the drawings.

Figure 1:
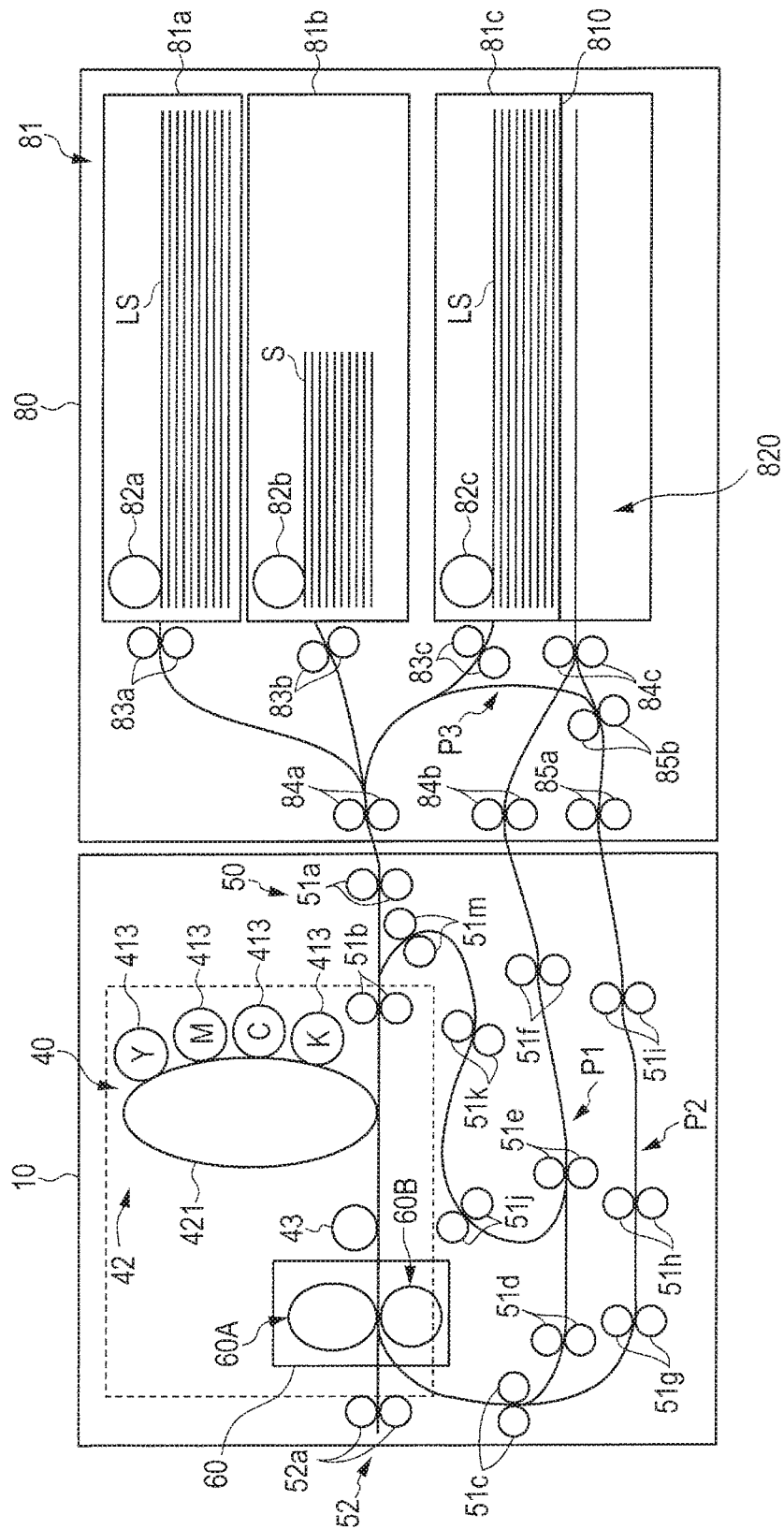
FIG. 1 schematically illustrates an entire configuration of an image forming system according to an embodiment.
Figure 2:
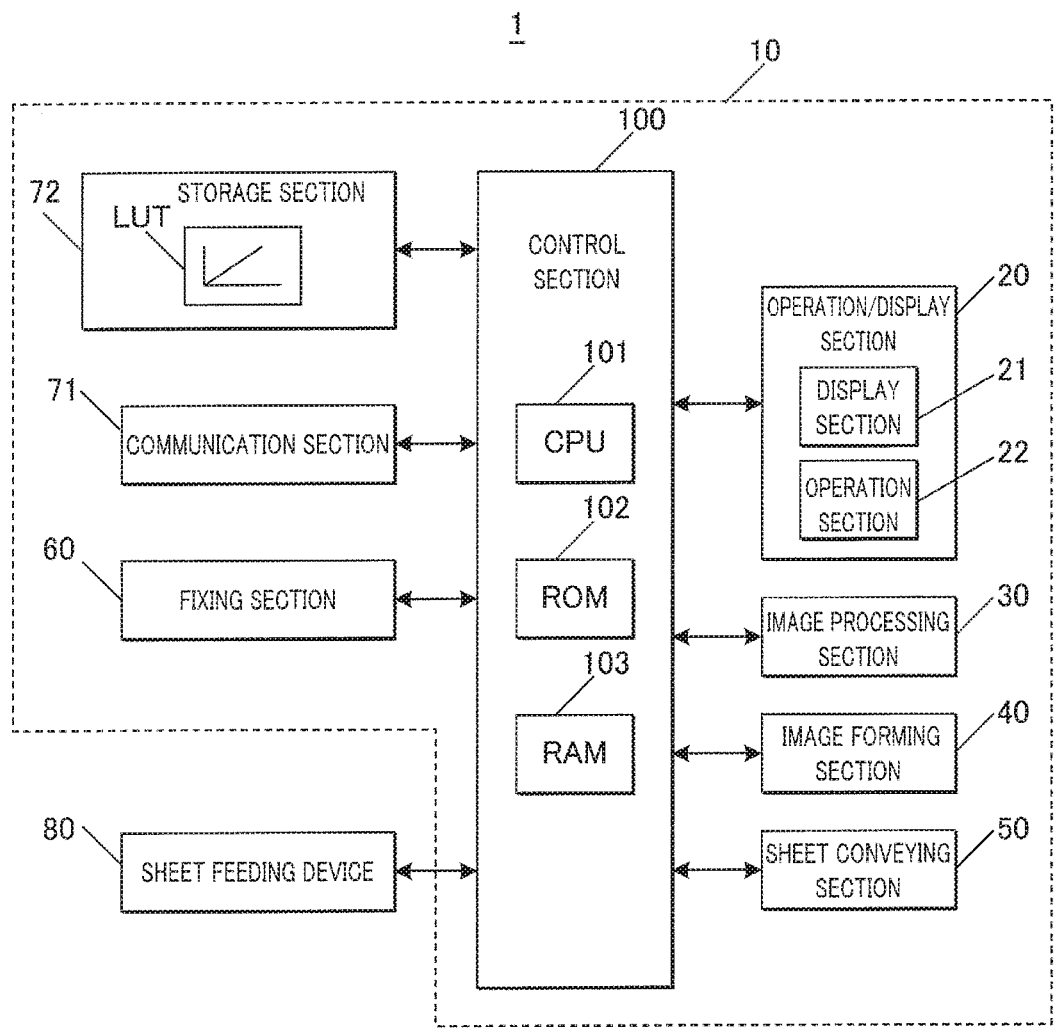
FIG. 2 illustrates a main part of a control system in the image forming system of FIG. 1.

FIG. 1 schematically illustrates an entire configuration of image forming system 1 according to the embodiment of the present invention. FIG. 2 illustrates a main part of a control system of image forming system 1 according to the embodiment.

Image forming system 1 is a system that uses a first sheet, which is long sheet LS, or a second sheet, which is sheet S (non-long sheet), as a recording medium, and forms images on long sheet LS or sheet S.

In the embodiment, long sheet LS refers to a cut sheet longer in the conveying direction than a commonly used cut sheets of A4-size and A3-size, for example. Sizes, i.e., dimensions, such as a length in the conveying direction, of such long sheets LS are stored as definition data in a memory or the like of the present system. When simply "a sheet" or various sheets are mentioned hereinafter, both long sheet LS and sheet S can be included.

As illustrated in FIG. 1, image forming system 1 includes image forming apparatus body 10 (hereinafter simply referred to as "image forming apparatus") configured to form images on sheets, and sheet feeding device 80 configured to feed various-size sheets including long sheet LS to image forming apparatus 10. Image forming apparatus 10 receives print data from a host device, such as a personal computer, and forms an image on long sheet LS or sheet S based on the received print data. In the embodiment, sheet feeding device 80 is an optional unit detachable from image forming apparatus 10.

Image forming apparatus 10 is an intermediate transfer-type color image forming apparatus utilizing electrophotographic process technology. Image forming apparatus 10 forms toner images by transferring color toner images of yellow (Y), magenta (M), cyan (C), and black (K) formed on photoconductor drums 413 to intermediate transfer belt 421 (primary transfer) to superimpose the four color toner images on intermediate transfer belt 421, and then transferring the superimposed toner images to sheet (secondary transfer).

Image forming apparatus 10 employs a tandem mode in which photoconductor drums 413 corresponding to YMCK four colors are arranged in series along the running direction of intermediate transfer belt 421 (the clockwise direction of FIG. 1), and each color toner image is successively transferred to intermediate transfer belt 421 in a single procedure.

As illustrated in FIG. 2, image forming apparatus 10 includes operation/display section 20, image processing section 30, image forming section 40, sheet conveying section 50, fixing section 60, and control section 100, for example.

Control section 100 includes central processing unit (CPU) 101, read-only memory (ROM) 102, and random-access memory (RAM) 103, for example. CPU 101 reads a program corresponding to processing details from ROM 102, loads the program into RAM 103, and performs, cooperatively with the loaded program, centralized control of the operation of the respective blocks of image forming system 1. During this step, various data stored in storage section 72 are referred to. Storage section 72 is composed of, for example, a nonvolatile semiconductor memory (so-called flash memory) and/or a hard disk drive.

Control section 100 transmits and receives various data to and from an external apparatus (personal computer, for example) connected to a communication network, such as a local area network (LAN) or a wide area network (WAN), via communication section 71. Control section 100, for example, receives image data transmitted from an external apparatus, and operates to form a toner image on various sheets, based on the image data (input image data). Communication section 71 is composed of, for example, a network interface card, such as a LAN adapter.

Operation/display section 20 is composed of, for example, a touch panel-type liquid crystal display (LCD), and functions as both display section 21 and operation section 22. Display section 21 displays, for example, various operation screens, the state of images, operation conditions of each function in accordance with display control signals input from control section 100. Operation section 22 equipped with various operation keys, such as a numeric keypad and a start key, receives various input operations by users and outputs operation signals to control section 100.

Image processing section 30 includes a circuit and/or the like that performs digital image processing of input image data in accordance with default settings or user settings. For example, image processing section 30 performs tone correction based on tone correction data (tone correction table LUT) in storage section 72 under the control of control section 100. Moreover, image processing section 30 performs, for example, various correction processing, such as color correction or shading correction, in addition to tone correction, and/or compression processing of input image data. Image forming section 40 is controlled, based on the thus-processed image data.

Image forming section 40 includes image forming units (not shown) for forming images of color toners of Y component, M component, C component, and K component, based on input image data, and intermediate transfer unit 42, for example.

The image forming units each include an exposing device, a developing device, a photoconductor drum, a charging device, and a drum cleaning device, for example, and are controlled by control section 100. In the embodiment, commonly known configurations are applicable to the image forming units, and thus their illustration and description are omitted.

Intermediate transfer unit 42 includes intermediate transfer belt 421 as an image bearing member, a primary transfer roller (not shown), a plurality of support rollers, a secondary transfer roller, and a belt cleaning device, for example. In the embodiment, commonly known configurations are applicable to intermediate transfer unit 42, and will be briefly described hereinafter.

The primary transfer roller is disposed facing photoconductor drum 413 of each color component on the side of the inner peripheral surface of intermediate transfer belt 421. A primary transfer nip, for transferring a toner image to intermediate transfer belt 421 from photoconductor drum 413, is formed by firmly pressing the primary transfer roller against photoconductor drum 413 via intermediate transfer belt 421.

The secondary transfer roller is disposed facing a backup roller, which is disposed on the downstream side in the belt running direction of a driving roller, on the side of the outer peripheral surface of intermediate transfer belt 421. A secondary nip, for transferring toner images to sheet from intermediate transfer belt 421, is formed by firmly pressing the backup roller against the secondary transfer roller via intermediate transfer belt 421.

In the embodiment, when various sheets pass through the secondary transfer nip, toner images on intermediate transfer belt 421 are transferred to the various sheets (secondary transfer). Specifically, secondary transfer bias is applied to the secondary transfer roller to provide charges of polarity opposite to toners to the rear surface side of the sheets (lower side in FIG. 1), thereby electrostatically transferring toner images to the sheets. The sheets, to which toner images are transferred, are conveyed to fixing section 60 via conveyance roller 43 disposed on the downstream side of intermediate transfer belt 421.

Fixing section 60 includes upper-side fixing section 60A, which contains a fixing surface-side member disposed on the fixing surface side of a sheet (upper-side surface in FIG. 1), lower-side fixing section 60B, which contains a rear surface-side supporting member disposed on the rear surface side of the sheet (opposite surface to the fixing surface, i.e., lower-side surface in FIG. 1), and a heating source (not shown), for example. A fixing nip for pinching and conveying a sheet is formed by firmly pressing the rear surface-side supporting member against the fixing surface-side member.

Fixing section 60 heats and presses a conveyed sheet in which toner images have been transferred (secondary transfer), thereby fixing toner images on the sheet.

In the embodiment, sheet conveying section 50 includes a plurality of conveying paths for conveying sheets fed from sheet feeding device 80 to image forming section 40, and ejecting the sheets on which images are formed or reversing sides of the sheets and conveying the sheets to image forming section 40 again for duplex printing, and conveyance rollers provided on the conveying paths.

As illustrated in FIG. 1, the conveying paths of sheet conveying section 50 in image forming apparatus 10 are connected with the conveying paths inside sheet feeding device 80 at three positions. Sheet conveying section 50 is configured by disposing conveyance rollers 51 (51a, 51b, 51c, 51d, 51e, 51f, 51g, 51h, 51i, 51j, 51k, and 51m) on a plurality of the conveying paths and sheet ejection rollers 52a, which constitute sheet ejection section 52.

Conveyance rollers 51a to 51m and sheet ejection rollers 52a are roller pairs each composed of two rollers, which are disposed facing a conveying path, and at least either of the rollers is rotated/driven by a single driving source (a motor, for example). Moreover, the roller pairs of conveyance rollers 51a to 51m and sheet ejection rollers 52a are each configured to be separated from a conveying path by an actuator or the like (not shown). The driving source, the actuator, and the like for each roller are operated under the control of control section 100. Conveying paths or the like of sheet conveying section 50 will be described in detail hereinafter.

In the following, the configuration of sheet feeding device 80 will be described. As illustrated in FIG. 1, sheet feeding device 80 includes sheet feed tray units 81 (81a to 81c), pickup rollers 82 (82a to 82c), a plurality of conveying paths, and conveyance rollers 83 (83a to 83c), 84(84a to 84c), and 85 (85a, 85b) provided on the conveying paths.

In the embodiment, sheet feeding device 80 includes three sheet feed tray units 81a, 81b, and 81c. Sheet feed tray units 81a to 81c each include a tray or sheet cassette that can store or be loaded with various sheets including long sheet LS. In the example illustrated in FIG. 1, long sheets LS are stored/stacked in topmost sheet feed tray unit 81a and bottommost sheet feed tray unit 81c, and sheets S are stored/stacked in the middle sheet feed tray unit 81b.

Pickup rollers 82 (82a to 82c) for picking up the uppermost stored/stacked sheet are disposed in sheet feed tray units 81a to 81c.

Sheet feed tray units 81a to 81c are each equipped with a sheet detection sensor including a guide plate or the like (not shown), which comes into contact with stored/stacked sheets, and thus size information of the sheets based on the positions of the guide plate is provided to control section 100 of image forming apparatus 10 from the sheet detection sensor.

Further, each of sheet feed tray units 81a to 81c, which is disposed inside the body (housing) of sheet feeding device 80, can be detached from the housing of sheet feeding device 80, for example, by pulling in the forward direction of the plane of FIG. 1.

As another example of sheet feed tray units 81, topmost sheet feed tray unit 81a, for example, can be replaced with a manual feed tray longer in the conveying direction in order to feed a long sheet longer in the conveying direction than long sheets LS illustrated in FIG. 1. In this case, one edge side of the manual feed tray is protruded in the right direction of FIG. 1 from the apparatus body (housing) of sheet feeding device 80.

Bottommost sheet feed tray unit 81c is partitioned so that the inner space is separated with inner wall 810 into the upper side and the lower side. The space in the upper side becomes a storage/stack space for storing/stacking sheets, whereas the space in the lower side becomes an evacuation space of sheet evacuation section 820, to which sheets are evacuated.

In the example illustrated in FIG. 1, sheet evacuation section 820 is configured by providing conveying paths composed of guide members or the like for evacuating long sheets LS to the lower-side evacuation space of sheet feed tray unit 81c. When long sheets LS are evacuated to the evacuation space, such conveying paths function to prevent the edge portions of long sheets LS from sinking downwards by their own weight and coming into contact with the bottom surface of sheet feed tray unit 81c.

In the neighborhood of sheet feed tray units 81a, 81b, and 81c inside sheet feeding device 80, provided are conveyance rollers 83 (83a, 83b, and 83c) for sending out the uppermost sheet picked up by each pickup roller 82 (82a, 82b, or 82c) towards image forming apparatus 10.

In addition, conveyance rollers 84 (84a, 84b, and 84c) and 85 (85a and 85b) for conveying sheets are also provided inside sheet feeding device 80. In the embodiment, conveyance rollers 83a to 83c, 84a to 84c, 85a, and 85b are roller pairs each composed of two rollers disposed facing a conveying path, and at least either of the rollers is rotated/driven by a single driving source (a motor, for example). The roller pairs of conveyance rollers 83, 84, and 85 are configured to be separated from the respective conveying paths by an actuator or the like (not shown). The driving source, the actuator, and/or the like for each roller are operated under the control of control section 100.

As illustrated in FIG. 1, three conveying paths, in which conveyance rollers 83*a*, 83*b*, and 83*c* are disposed, converge into one on the downstream side in the conveying direction, and the converged conveying path is connected with a conveying path, in which conveyance rollers 51*a* are disposed, of image forming apparatus 10. Conveyance rollers 84*a* are disposed in the converged conveying path.

In sheet feeding device 80, conveyance rollers 84*b* are disposed in first conveying path P1 described hereinafter. Further, conveyance rollers 85*a* and 85*b* are disposed in second conveying path P2 described hereinafter. First conveying path P1 and second conveying path P2 converge so as to be connected with a conveying path of the above-mentioned sheet evacuation section 820. Conveyance rollers 84*c* are disposed at a position where first conveying path P1 and second conveying path P2 converge.

In the embodiment, a conveying path on the downstream side of conveyance rollers 85*b* diverge into the conveying path of sheet evacuation section 820 (a path leading to conveyance rollers 84*c*) and a path leading to conveyance rollers 84*a* (re-feeding path P3 for additional printing).

In the embodiment, conveyance rollers 84*b* and 84*c* of sheet feeding device 80 function as switch-back rollers that can rotate in the forward and reverse directions.

In image forming system 1 having the above configuration, when images are formed only one side of sheets and then the sheets are ejected, sheets stored in sheet feed tray units 81*a* to 81*c* of sheet feeding device 80 are sent out one by one from the uppermost portion and fed inside image forming apparatus 10 from conveyance rollers 84*a*.

The sheets fed inside image forming apparatus 10 are conveyed to image forming section 40 by conveyance rollers 51*a* and 51*b*. During this step, a registration roller section, where registration rollers 51*b* are arranged, corrects the tilt of the fed sheets and adjusts the timing of conveyance. Then, toner images on intermediate transfer belt 421 are collectively transferred to one-side surface of the sheets in image forming section 40 (secondary transfer), and a fixing step is performed in fixing section 60. Sheets bearing formed images are ejected outside the apparatus by sheet ejection section 52 equipped with sheet ejection rollers 52*a*.

(Configuration of Conveyance Paths or the Like)

In an image forming apparatus or an image forming system that forms images on long sheets LS, there is a growing demand for duplex printing in which sides of long sheets LS are reversed on the side of image forming apparatus body, i.e., inside the housing of image forming apparatus 10.

In order to achieve reversing of sides of long sheets LS, there is a technical challenge in how to secure space for reversing sides inside image forming apparatus 10 while avoiding increase in size of the apparatus. Further, when duplex printing is performed through continuously conveying a plurality of long sheets LS and reversing sides of long sheets LS, there is a challenge in how to shorten intervals between long sheets LS in order to enhance productivity.

In order to overcome the challenges, image forming system 1 provides two conveying paths of first conveying path P1 and second conveying path P2 inside sheet feeding device 80 and image forming apparatus 10, and performs conveyance control by control section 100 such that space between a plurality of long sheets LS becomes small when images are formed on both sides of a plurality of long sheets LS by image forming section 40.

First conveying path P1 is a path that receives sheets on the downstream side of image forming section 40 in the conveying direction and reverses sides of the sheets.

In the embodiment, first conveying path P1 is a path that branches into the direction of conveyance rollers 51*d* from conveyance rollers 51*c* of image forming apparatus 10, and includes a path, towards sheet evacuation section 820, in which conveyance rollers 51*e*, 51*f*, and conveyance rollers 84*b* and 84*c* of sheet feeding device 80 are disposed. First conveying path P1 also includes a path, which is branched from conveyance rollers 51*e* of image forming apparatus 10, in which conveyance rollers 51*j*, 51*k*, and 51*m* are disposed.

In other words, in the embodiment, first conveying path P1 branches from the left side of conveyance roller pair 51*e* in FIG. 1, i.e., from the conveying path between conveyance roller pairs 51*d* and 51*e*. As illustrated in FIG. 1, the branched path is curved like inverted S and connected with the conveying path between conveyance roller pairs 51*a* and 51*b* (main conveying path) at the edge portion on the downstream side in the conveying direction. Since the branched path has such a shape, the housing of image forming apparatus 10 can be downsized as much as possible. Conveyance roller pairs 51*j*, 51*k*, and 51*m* are disposed in this order in the branched path from the upstream side in the conveying direction.

Second conveying path P2 is a path that receives long sheets on the downstream side of image forming section 40 in the conveying direction and conveys the sheets to first conveying path P1 without reversing sides of the sheets.

In the embodiment, second conveying path P2 is a path that branches into the direction of conveyance rollers 51*g* from conveyance rollers 51*c* of image forming apparatus 10 (outer side of first conveying path P1), and includes a path towards sheet evacuation section 820, in which conveyance rollers 51*h* and 51*i*, and conveyance rollers 85*a*, 85*b*, and 84*c* of sheet feeding device 80 are disposed.

As illustrated in FIG. 1, second conveying path P2 is disposed below first conveying path P1 and connected with first conveying path P1 at a position of conveyance rollers 84*c* of sheet feeding device 80. Sheet evacuation section 820 of sheet feeding device 80 is a converged path of second conveying path P2 and first conveying path P1, in other words, a path shared by second conveying path P2 and first conveying path P1.

In the embodiment, second conveying path P2 is provided so that re-feeding path P3 for additional printing, which is a path leading to conveyance rollers 84*a*, is branched from the downstream side in the conveying direction of conveyance rollers 85*b* of sheet feeding device 80. Re-feeding path P3 is provided inside sheet feeding device 80, i.e., inside the housing, and is a path for re-feeding sheets returned to sheet feeding device 80 through second conveying path P2 to image forming section 40 without reversing sides of the sheets. Re-feeding path P3 is used for additional printing, in other words, when images are formed on one-side surfaces of sheets a plurality of times.

In the embodiment, conveyance rollers 51*d*, 51*e*, 51*f*, 51*j*, 51*k*, and 51*m* inside image forming apparatus 10 and conveyance rollers 84*b* and 84*c* inside sheet feeding device 80, which are roller pairs disposed in first conveying path P1, are separated from first conveying path P1 by a control signal (instruction) from control section 100. Similarly, conveyance rollers 51*g*, 51*h*, and 51*i* inside image forming apparatus 10 and conveyance rollers 85*a* and 85*b* inside sheet feeding device 80, which are roller pairs disposed in second conveying path P2, are also separated from second conveying path P2 by a control signal (instruction) from control section 100.

In the embodiment, as illustrated in FIG. 1, a plurality of conveying paths P1 and P2 are provided inside image forming apparatus 10, which is on the side of the image forming apparatus body, so as to reverse a path for image formation. Due to such a configuration, a waiting space for the following sheet can be created even when a sheet with a length extending over from image forming section 40 to sheet feeding device 80 (which is an optional sheet feeding device) is used, and consequently space between sheets in duplex circulation can be minimized.

In the embodiment, by providing a plurality of conveying paths P1 and P2 for duplex printing in image forming apparatus 10 and sheet feeding device 80, and by providing a path for evacuating sheets in sheet feeding device 80, which is an optional sheet feeding device, efficient conveyance for duplex printing of long sheets (duplex circulation) is achieved.

Providing a path for evacuating sheets (sheet evacuation section) in sheet feeding device 80, which is an optional sheet feeding device, so as to be connected with the above-mentioned conveying paths P1 and P2 enables duplex printing of long sheets as well as further downsizing of image forming apparatus 10.

Figure 3:
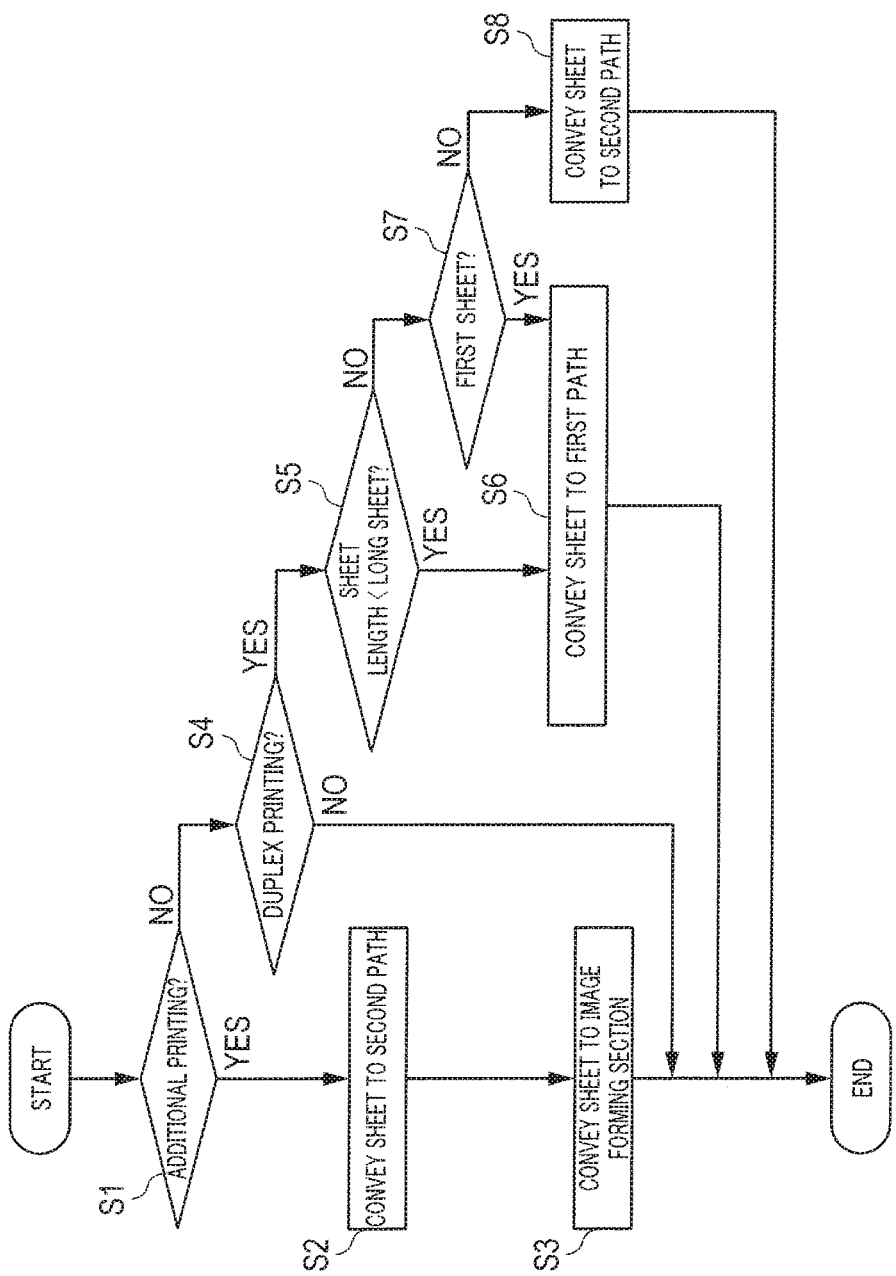
FIG. 3 is a flow chart showing a sheet conveying process of the image forming system of the embodiment.

In the following, conveyance control of sheets performed by control section 100 will be described with reference to the flow chart of FIG. 3. The flow chart shown in FIG. 3 is an example of conveyance control of sheets performed by control section 100, and such control is performed for every sheet used on the printing.

Control section 100 refers to print job data, identifies a specified printing method for every sheet as a printing medium, and controls conveyance of sheets so as to achieve the identified printing method. In the embodiment, the identification of a printing method by control section 100 is performed while an image is formed on one surface (upper-side surface in FIG. 1) of a sheet in image forming section 40 (i.e., during printing).

In step S1, control section 100 determines whether additional printing is performed for a sheet during printing. If control section 100 determines that additional printing is performed (step S1, YES), it moves to step S2, whereas if control section 100 determines that additional printing is not performed (step S1, NO), it moves to step S4.

In step S2 when the control section 100 determines that additional printing is performed, control section 100 performs conveyance control to convey the sheet to second conveying path P2. Such control is performed, for example, by switching positions of conveying guide members (not shown) provided on the downstream side in the conveying direction of upper-side fixing section 60A and lower-side fixing section 60B until the sheet during printing reaches fixing section 60, and subsequently switching positions of conveying guide members (not shown) provided on the downstream side in the conveying direction of conveyance rollers 51c until the sheet reaches conveyance rollers 51c. Conveyance control is similarly performed hereinafter through the above-mentioned process when a sheet is conveyed to any branched conveying path.

In the next step S3, control section 100 performs control to convey the sheet to conveying path P3 from second conveying path P2, send the sheet into image forming section 40, and then eject the sheet from sheet ejection section 52. Through such conveyance control, additional printing in which images are formed on the same surface twice is performed.

In step S4, control section 100 determines whether duplex printing is performed for a sheet during printing. If control section 100 determines that duplex printing is performed (step S4, YES), it moves to step S5. Meanwhile, if control section 100 determines that duplex printing is not performed (step S4, NO), it performs control to eject the sheet during printing from sheet ejection section 52.

In step S5, control section 100 determines whether a sheet during printing is long sheet LS or not, based on whether the length in the conveying direction is shorter than a predetermined length or not.

Such determination is performed, for example, by comparing a sheet size specified by a print job and the above-mentioned definition data in which a size of a long sheet is defined. In other words, control section 100 determines that a sheet during printing is long sheet LS if the length in the conveying direction of the sheet specified by the print job meets a length defined as a long sheet. Meanwhile, control section 100 determines that a sheet during printing is not long sheet LS if the length in the conveying direction of the sheet specified by the print job does not meet a length defined as a long sheet.

If control section 100 determines that a sheet during printing is not long sheet LS (step S5, YES), it regards the sheet as common sheet S and moves to step S6, whereas if control section 100 determines that a sheet during printing is long sheet LS (step S5, NO), it moves to step S7.

In step S6, control section 100 performs control to convey the sheet during printing (sheet S) to the above-mentioned first conveying path P1. Subsequently, control section 100 performs control to reverse the rotation directions of conveyance rollers 51e and 51f when the rear edge in the traveling direction of the sheet passes through conveyance rollers 51e, and allow the sheet to travel in the conveying path in which conveyance rollers 51j are disposed.

Through such control (switch-back operation), the sheet (sheet S) reverses the traveling direction, and is sent back to image forming section 40 by conveyance rollers 51j, 51k, and 51m. After that, control section 100 performs control to eject sheet S from sheet ejection section 52.

In step 7 in which the sheet during printing has been determined to be long sheet LS (step S5, NO), control section 100 determines whether the sheet during printing (long sheet LS) is the first sheet or not. As used herein, "the first sheet" refers to the first sheet in a duplex print job in this example.

When control section 100 determines that long sheet LS during printing is the first sheet (step S7, YES), it moves to step S6. Meanwhile, when control section 100 determines that long sheet LS during printing is not the first sheet, in other words, the second or subsequent long sheets LS (step S7, NO), it moves to step S8.

In step S6, control section 100 conveys the sheet during printing (long sheet LS) to the above-mentioned first conveying path P1. Subsequently, control section 100 performs control to reverse the rotation directions of conveyance rollers 51e and 51f, as well as conveyance rollers 84b and 85b of sheet feeding device 80 when the rear edge in the traveling direction of long sheet LS passes through conveyance rollers 51e, and allow the sheet to travel in the conveying path in which conveyance rollers 51j and the like are disposed.

Through such control (switch-back operation), the sheet (long sheet LS) reverses the traveling direction, and is sent back to image forming section 40 by conveyance rollers 51*j*, 51*k*, 51*m*, and the like. After that, control section 100 performs control to eject long sheet LS from sheet ejection section 52 (see FIG. 4).

In step S8, control section 100 conveys the sheet during printing (long sheet LS) to the above-mentioned second conveying path P2.

Through such control, the front edge in the traveling direction of the second or subsequent long sheets LS is sent to second conveying path P2 branched from the downstream side of conveyance rollers 51*c*, and to sheet evacuation section 820 via conveyance rollers 51*g*, 51*h*, and 51*i*, as well as conveyance rollers 85*a*, 85*b*, and 84*c* of sheet feeding device 80.

Subsequently, control section 100 performs control to reverse the rotation direction of conveyance rollers 84*c* and allows the sheet to travel in first conveying path P1 in which conveyance rollers 84*b* and the like are disposed when the rear edge in the traveling direction of long sheet LS reaches a nip of conveyance rollers 84*c* of sheet feeding device 80.

Through such control (switch-back operation), the sheet (long sheet LS) reverses the traveling direction, and is sent into image forming section 40 by conveyance rollers 51*j*, 51*k*, 51*m*, and the like. After that, control section 100 performs control to eject long sheet LS from sheet ejection section 52 (see FIG. 4).

In image forming system 1 including the above-mentioned first conveying path P1 and second conveying path P2, control section 100 performs conveyance control using the plurality of conveying paths so as to adjust intervals between long sheets LS, and thus space between sheets can be minimized when duplex printing of a plurality of long sheets LS is performed.

As in the foregoing, when duplex printing of a plurality of long sheets LS is performed, productivity in printing can be enhanced by performing control to convey the first sheet to the upstream side of image forming section 40 via first conveying path P1, and to convey the second and subsequent sheets to the upstream side of image forming section 40 via second conveying path P2 and first conveying path P1.

In the following, adjustment of space between sheets and the like in duplex printing of a plurality of long sheets LS will be described with reference to FIG. 4 and the rest FIGS. In the following description, the first long sheet in duplex printing is denoted by LS1, the second long sheet is denoted by LS2, and the third and subsequent long sheets are also denoted by similar symbols.

Figure 4:
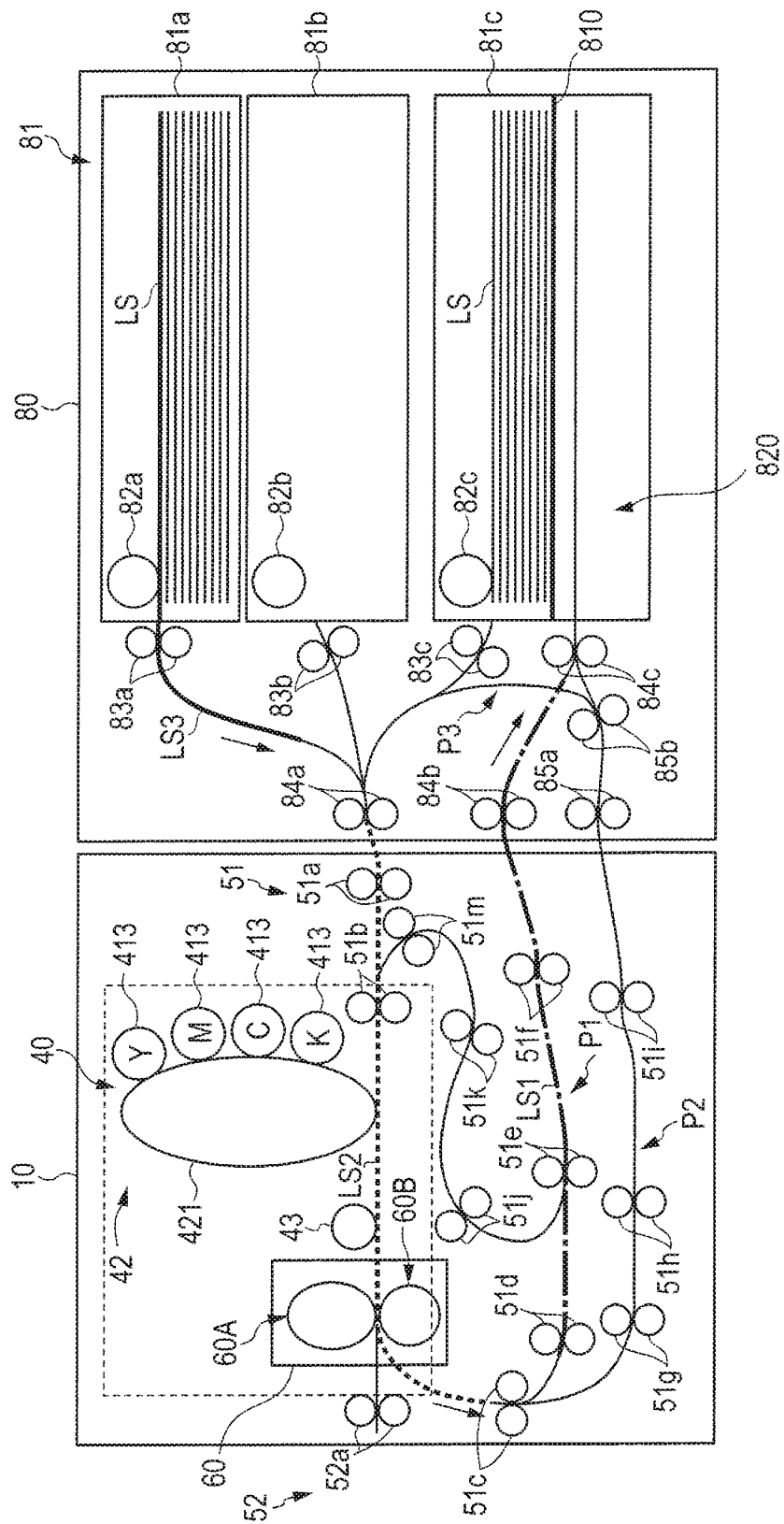
FIG. 4 illustrates a conveying process of long sheets in the image forming system of the embodiment when images are formed on both sides of a plurality of the long sheets.
Figure 8:
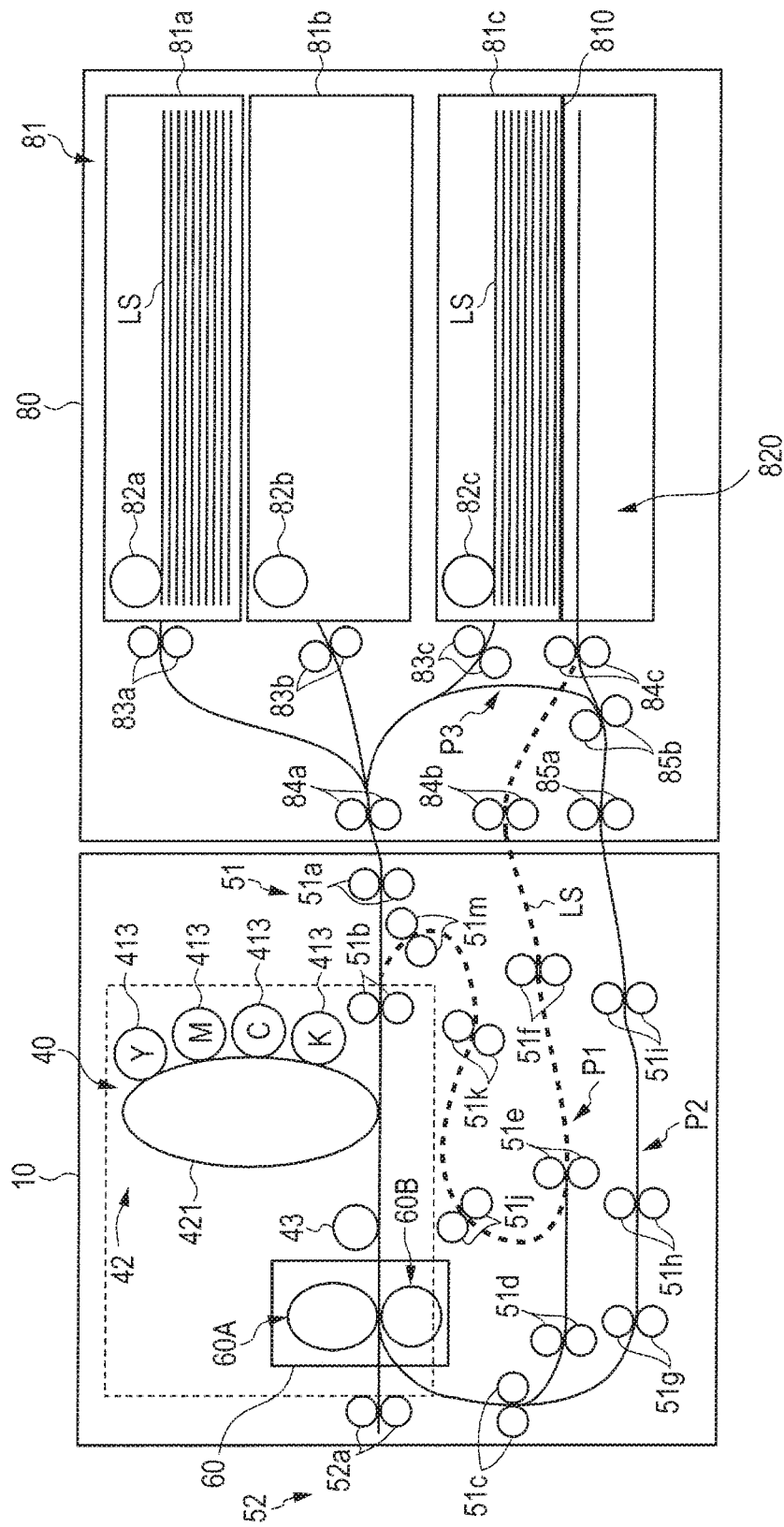
FIG. 8 illustrates a case in which the length in the conveying direction of a long sheet extends over from before an image forming section to a sheet evacuation section.

Long sheets LS1, LS2, and the like of FIG. 4, for example, are illustrated in a size with a longer length in the conveying direction than that of long sheets LS inside sheet feeding units 81*a* and 81*c*, particularly, in a longer size than the length (width) in the sheet conveying direction of the housing of image forming apparatus 1. More specifically, as illustrated in FIG. 8, assumed is a case in which the length in the conveying direction of a long sheet extends over from immediately before image forming section 40 to immediately before sheet evacuation section 820.

Figure 5:
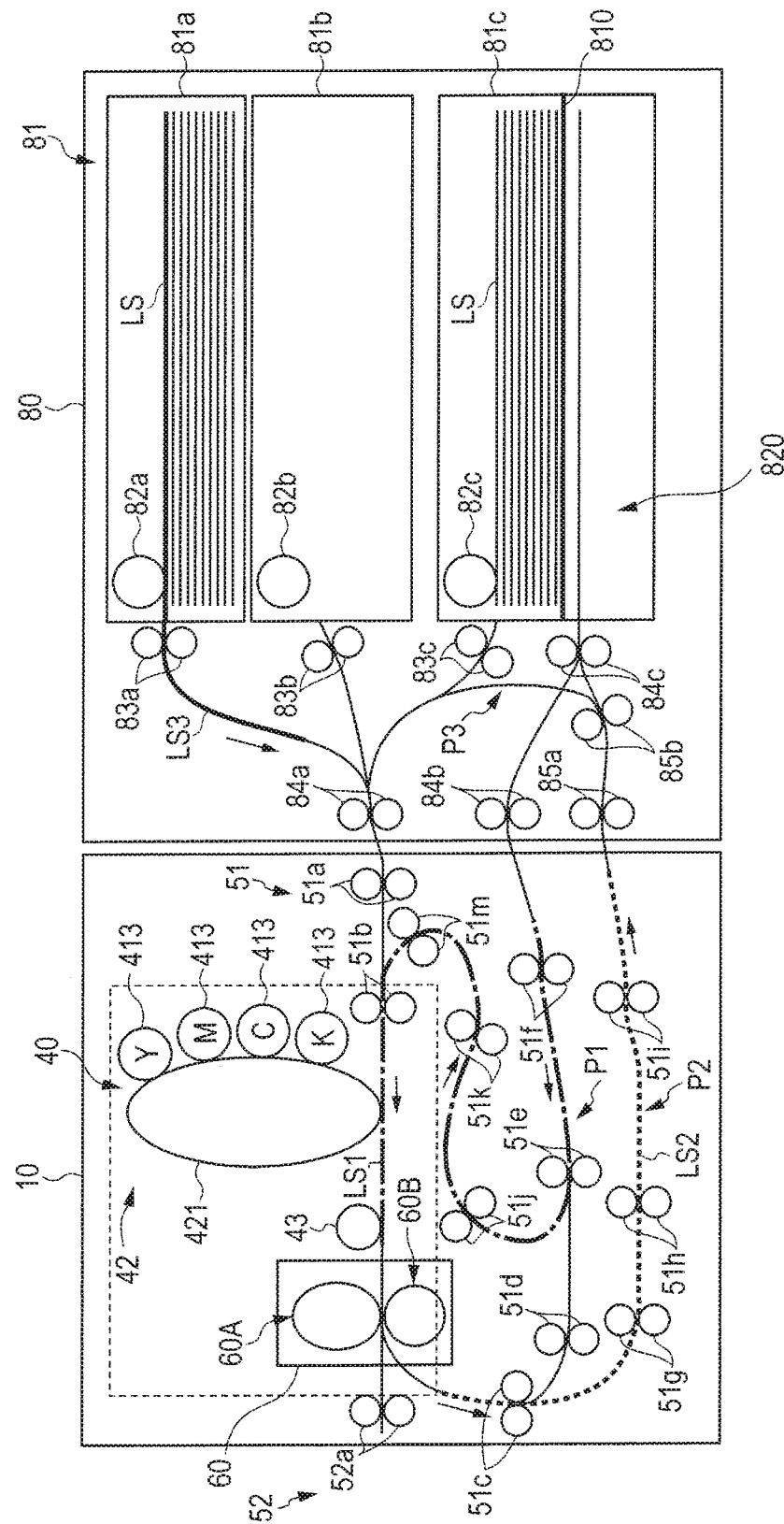
FIG. 5 illustrates a conveying process of long sheets in the image forming system of the embodiment when images are formed on both sides of a plurality of the long sheets.
Figure 6:
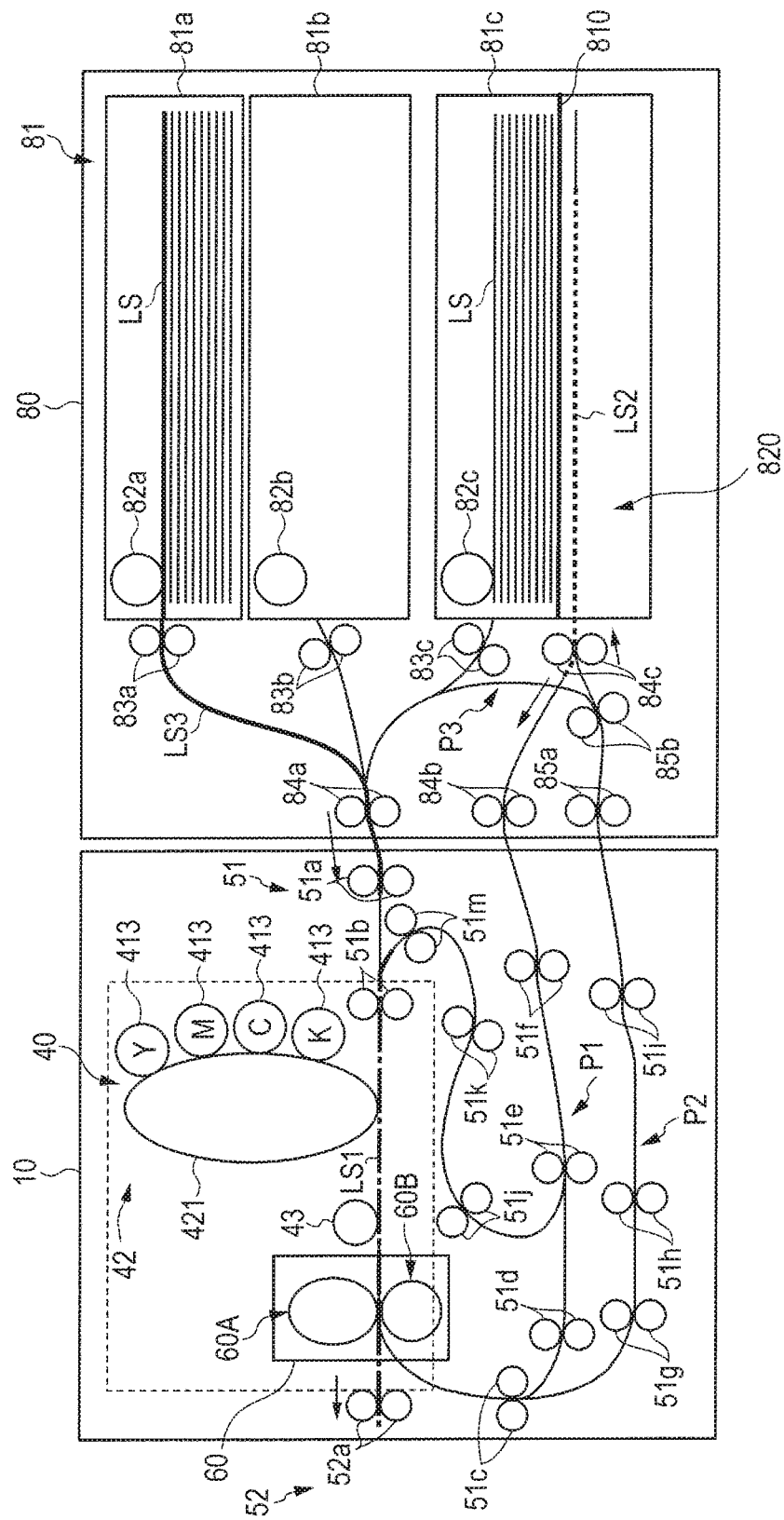
FIG. 6 illustrates a conveying process of long sheets in the image forming system of the embodiment when images are formed on both sides of a plurality of the long sheets.
Figure 7:
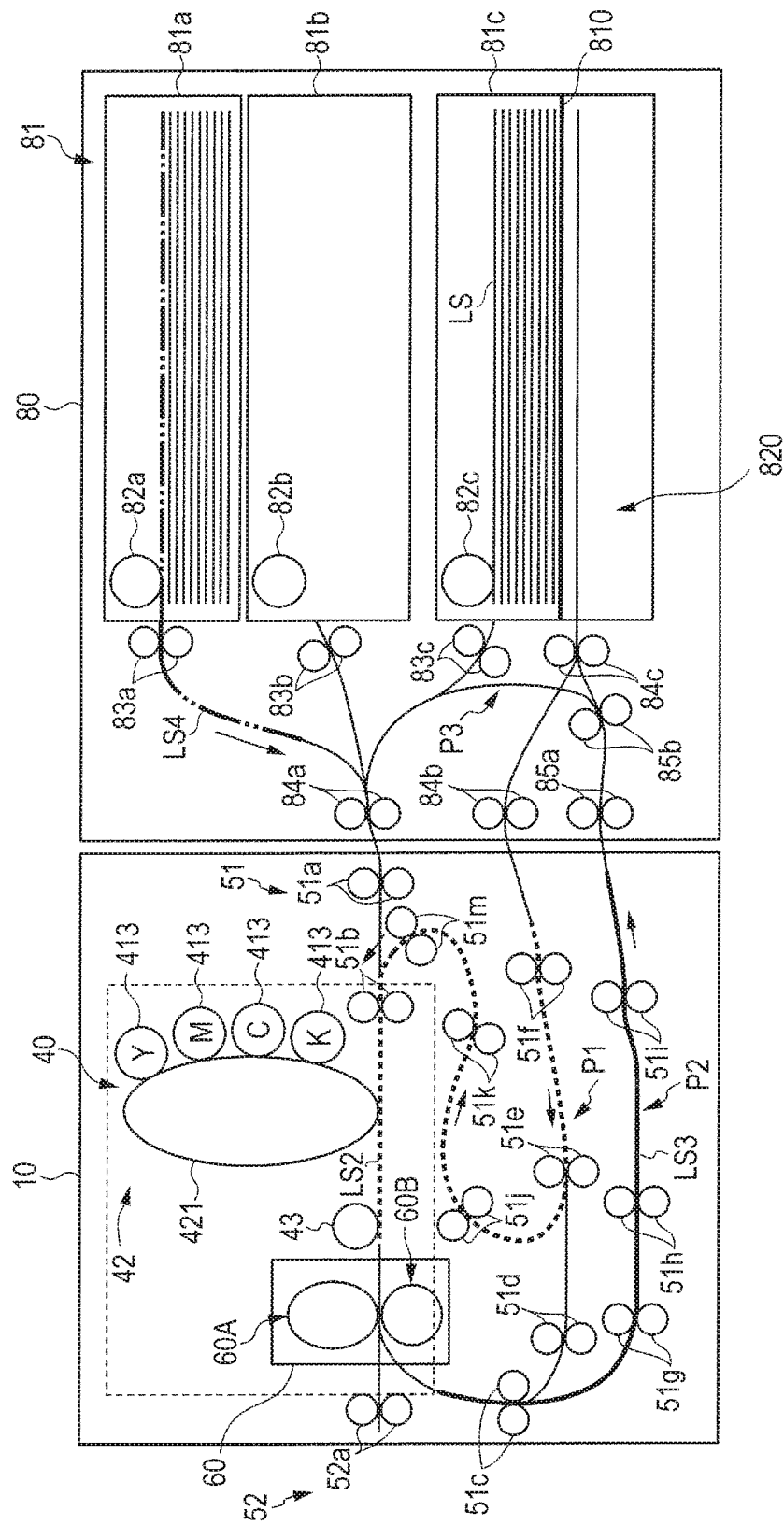
FIG. 7 illustrates a conveying process of long sheets in the image forming system of the embodiment when images are formed on both sides of a plurality of the long sheets.

FIGS. 4 to 7 illustrate a state in which a plurality of long sheets are simultaneously conveyed in a print job for continuous duplex printing of a plurality of long sheets. FIGS. 4 to 6 illustrate states in which three long sheets LS1, LS2, and LS3 are conveyed, and FIG. 7 illustrates a state in which the first long sheet LS1 has been ejected, and the conveyance of the fourth long sheet LS4 has just started. In the FIGS., long sheet LS1 is represented by a long dashed dotted line, long sheet LS2 by a dotted line, long sheet LS3 by a bold line, and long sheet LS4 by a long dashed double-dotted line.

In the following, reversing sides and conveying for duplex printing will be called "reverse conveying." Moreover, a path extending from fixing section 60 and leading to conveyance rollers 51 will be called "reversing path." Referring to FIGS. 4 and 5, in the embodiment, the first long sheet LS1 undergoes reverse conveying via first conveying path P1, and the second long sheet LS2 is conveyed via second conveying path P2, as described above.

Specifically, the first long sheet LS1, on which image forming section 40 has started printing, passes through first conveying path P1 via the reversing path after printing on the first surface (front surface) is performed, and is guided to sheet evacuation section 820 in the lower portion of sheet feeding device 80, as illustrated in FIG. 4. Subsequently, image forming section 40 performs printing on the first surface (front surface) of the second long sheet LS2, and LS2 is conveyed to the reversing path in substantially the same manner as above.

As illustrated in FIG. 5, once the first long sheet LS1 passes through a switching position (nip of conveyance rollers 51*e*) in first conveying path P1 inside image forming apparatus 10, LS1 is conveyed in the reverse direction and sent back to image forming section 40 via the path in which conveyance rollers 51*j* and the like are disposed. The second long sheet LS2 is conveyed to sheet evacuation section 820 of sheet feeding device 80 in substantially the same manner as the first sheet except for being conveyed to sheet evacuation section 820 via second conveying path P2 in order to prevent collision with the first sheet LS1 during reverse conveying.

After the rear edge in the conveying direction of the second long sheet LS2 exits from image forming section 40, the first long sheet LS1 undergoes printing on the second surface (rear surface) and is ejected from image forming apparatus 10 (see FIG. 6). Subsequently, printing is performed on the first surface (front surface) of the third long sheet LS3 in a mode that follows the rear edge of the first long sheet LS1. After that, sheets are conveyed so that printing is performed alternately on the front and rear surfaces, in substantially the same manner as the above-mentioned sheet circulation of the first and the second sheets (see FIG. 7).

FIG. 7 illustrates a state in which the first long sheet LS1 after duplex printing has been ejected completely, and the third long sheet LS3 is sent to second conveying path P2 and the fourth long sheet LS4 starts feeding while the second long sheet LS2 undergoes printing on the rear side after passing through two conveying paths P2 and P1. In substantially the same manner as above, long sheet LS ($LS_n$) that starts feeding is sent inside image forming apparatus 10 when the rear edge in the traveling direction of the second preceding long sheet LS ($LS_{n-2}$) passes through conveyance rollers 51*m*.

Accordingly, control section 100 controls the rotation of conveyance rollers 84*a* and the like inside sheet feeding device 80 such that the n-th long sheet $LS_n$ is sent inside image forming apparatus 10 when the rear edge in the traveling direction of the second preceding long sheet LS ($LS_{n-2}$) passes through conveyance rollers 51*m*.

In the embodiment, when a plurality of long sheets LS are conveyed in duplex printing as described above, conveyance control is performed so that a sheet conveying speed in sheet conveyance at the time other than image formation is faster than that at the time of image formation. Specifically, when a plurality of long sheets LS are conveyed in duplex printing, control section 100 controls the rotation speed of the corresponding conveyance rollers such that a sheet conveying speed in sheet conveyance at the time other than image formation is faster than that at the time of image formation.

In the embodiment, by performing such conveyance control, sides of the preceding long sheet can be reversed and conveyed to immediately before image forming section 40 during printing on a front surface of the following long sheet, thereby minimizing space between long sheets.

Further, in the embodiment, during image formation on long sheets, control section 100 performs control to separate conveyance rollers on the rear edge side in the traveling direction of the sheets (conveyance rollers 51*f*, 51*e*, 51*j*, 51*k*, and 51*m* in the example of FIG. 5) from the conveying path. Due to such control, long sheets are conveyed by sheet conveying members inside image forming section 40 (conveyance roller 43, intermediate transfer belt 421, for example) without transmitting driving force from the separated conveyance rollers. This can prevent image defects (displacement in transfer, for example) that may result from a difference between a sheet conveying speed by image forming section 40 and a conveying speed by conveyance rollers on the rear edge side in the conveying direction of sheets.

According to image forming system 1 of the embodiment, a waiting space for the following sheet can be provided by second conveying path P2 and/or sheet evacuation section 820, even for long sheet LS with a length in the conveying direction extending over from image forming section 40 to an optional sheet feeding device (see FIG. 8). Image forming system 1 can achieve smooth duplex printing of each long sheet while continuously conveying long sheets.

Figure 9:
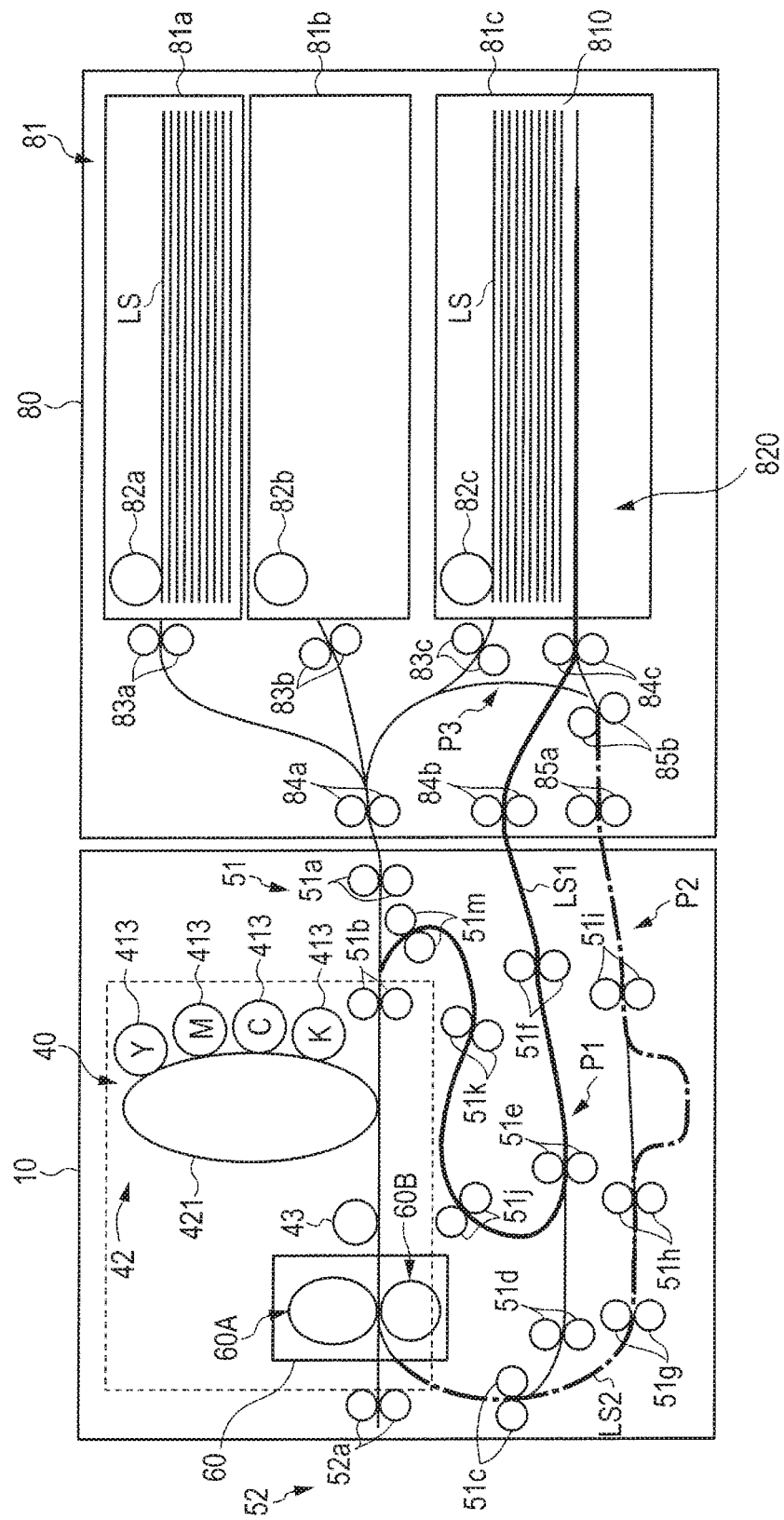
FIG. 9 illustrates a conveying process of long sheets and an example of conveyance control when a long sheet with a longer length in the conveying direction is conveyed.

FIG. 9 illustrates a conveying state in which the length in the conveying direction of long sheet LS used in a duplex printing job is longer than those of the long sheets illustrated in FIGS. 4 to 8. In this case, if the first long sheet LS1 and the second long sheet LS2 are conveyed so as to minimize space between them, the second long sheet LS2 comes close to sheet evacuation section 820 while part of the first long sheet LS1 still does not exit from sheet evacuation section 820 (state of being pinched between conveyance rollers 84*c*). If conveyance control similar to the above-mentioned one is performed in this case, long sheets LS1 and LS2 are likely to collide at the position of conveyance rollers 84*c*, resulting in a jam.

In order to avoid a jam, second conveying path P2 is configured to allow a middle region in the conveying direction of a long sheet to sag. Specifically, as illustrated in FIG. 9, a loop forming section and a loop space, which allow a middle region in the conveying direction of a long sheet to sag like a loop, are provided in the path between conveyance rollers 51*h* and conveyance rollers 51*i* in second conveying path P2.

In this case, control section 100 performs the following conveyance control. Control section 100, when the following long sheet (LS2) reaches conveyance rollers 85*b*, controls the rotation of conveyance rollers 85*b* and the like such that the front edge in the conveying direction of long sheet LS2 stops before conveyance rollers 84*c* in second conveying path P2 if the preceding long sheet (LS1) does not exit from sheet evacuation section 820 and conveyance rollers 84*c*.

In the example illustrated in FIG. 9, control section 100 controls the rotation of each conveyance roller such that conveyance rollers 85*b*, 85*a*, and 51*i* are stopped at a predetermined timing while the rotation of conveyance rollers 51*i*, 51*h*, 51*g*, and 51*c* is maintained until the rear edge in the conveying direction of long sheet LS2 exits from fixing section 60.

Through such control, as illustrated, the middle region in the conveying direction of long sheet LS2 sags in the loop space, which is formed in the path between conveyance rollers 51*h* and conveyance rollers 51*i*, while the preceding long sheet LS1 becomes ejectable from sheet ejection section.

As described above, the embodiment can create a waiting space for the following sheet, even for a sheet with a length extending over from the image forming section to the optional sheet feeding device, by providing a plurality of paths for duplex printing in the image forming apparatus body, thereby narrowing space between sheets during conveying for duplex printing.

Other Embodiments of Sheet Evacuation Section

In the above-mentioned embodiment, sheet evacuation section 820 is configured by providing a conveying path by a guide member and the like for evacuating long sheets LS into evacuation space in the lower side of sheet feed tray unit 81*c*. As a modification, the sheet evacuation section may be configured so that a long sheet is ejected into and configured to be loaded with long sheets LS, as illustrated in FIG. 10.

Figure 10:
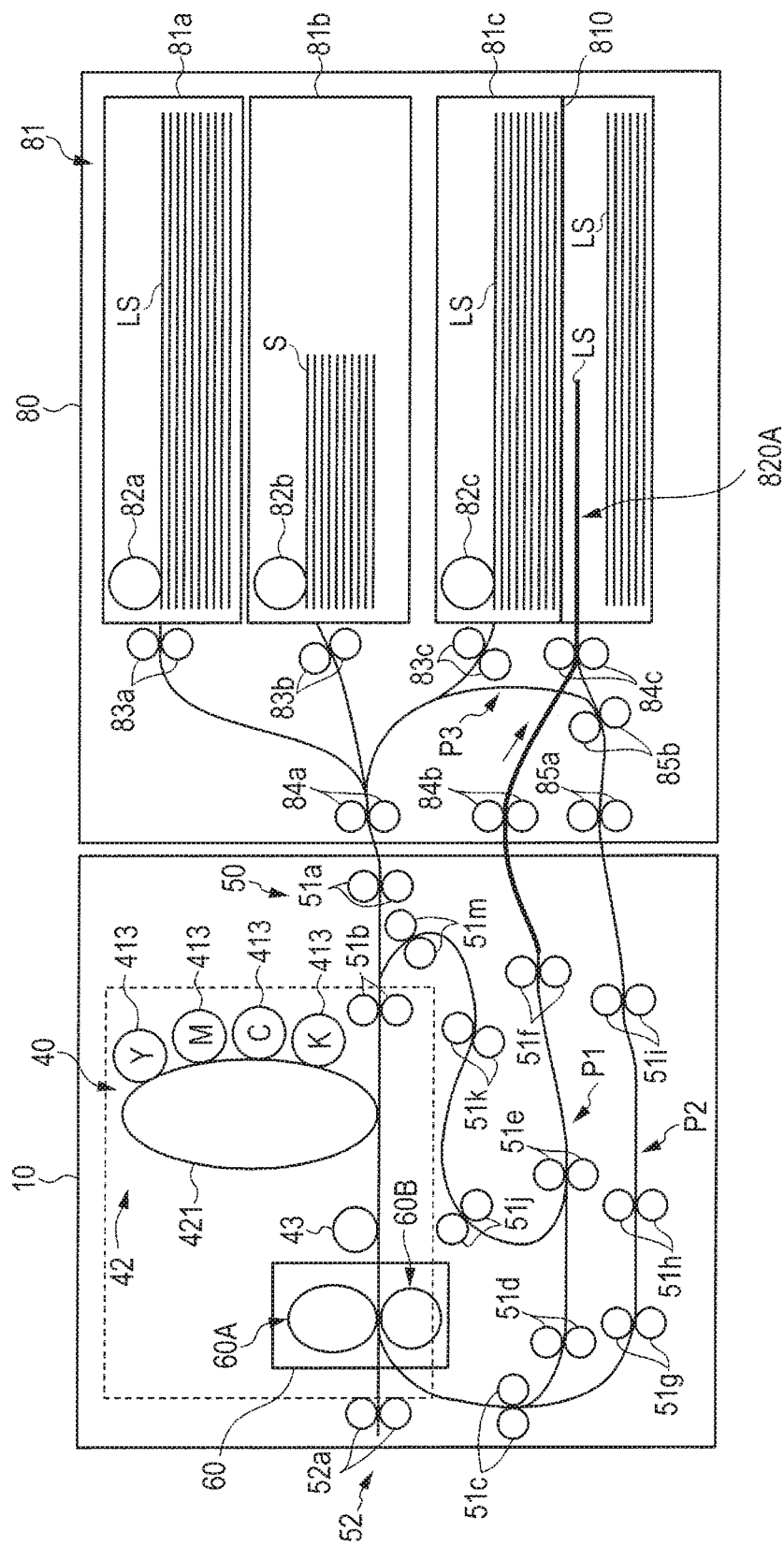
FIG. 10 illustrates another embodiment of the sheet evacuation section.

Sheet evacuation section 820A illustrated in FIG. 10 is configured through minimizing the size of a guide member or the like, which constitutes a sheet conveying path in the evacuation space, or configured without a guide member or the like. Such configuration enables ejection of and/or loading with long sheets LS on the bottom surface of sheet feed tray unit 81*c*.

Alternatively, sheet evacuation section 820A may be configured in which a sheet tray for ejection of and/or loading with long sheets LS is provided in the lower portion of the evacuation space such that the sheet tray is pulled out from the body (housing) of sheet feeding device 80.

The embodiment equipped with a structure for ejection of and/or loading with long sheets LS on the side of sheet feeding device 80 eliminates a need for providing a sheet ejection unit corresponding to the length of a long sheet on the side of image forming apparatus 10.

Further, according to the embodiment, even if long sheet LS is a sheet with stiffness that cannot be conveyed in the inverted S-like curved conveying path of first conveying path P1 towards image forming section 40 (cardboard, for example), duplex printing can be performed by conveying the sheet without passing through first conveying path P1.

Specifically, control section 100 performs conveyance control such that long sheet LS, which is cardboard or the like, is ejected into sheet evacuation section 820A via second conveying path P2 after printing is performed on the first surface (front surface) in image forming section 40. In this case, long sheet LS is ejected into sheet evacuation section 820A with the printed surface faced downward, and thus easy manual duplex printing is possible without a need for reversing sides of sheets and setting when printing is performed again on the second surface (rear surface).

In each above-mentioned embodiment, when a jam occurs inside image forming apparatus 10 during duplex printing of a plurality of sheets, control section 100 can perform control to separate a conveyance roller inside image forming apparatus 10 from the conveying path, and to convey or eject sheets being conveyed into inside sheet evacuation section 820 or 820A completely. Through such control, sheets being conveyed other than a jammed sheet can be evacuated inside sheet feeding device 80 and the jammed sheet can be removed from a conveying path of image forming apparatus 10, thereby facilitating the process to clear a jam.

When a sheet jam occurs in duplex printing of a plurality of sheets, control section 100 performs the following conveyance control. When it detects a sheet jam and when a sheet other than sheets evacuated into sheet evacuation section 820 jams, control section 100 performs control to convey a sheet being conveyed to sheet evacuation section 820 of sheet feeding device 80 or on the side of image forming apparatus 10. Such conveyance control can evacuate a sheet being conveyed or eject a sheet being conveyed outside the apparatus quickly.

In each above-mentioned embodiment, when either one or both of first conveying path P1 and second conveying path P2 are not used during image formation on sheets, control section 100 may perform control to separate conveyance rollers disposed on the non-used conveying path(s) from the non-used conveying path(s) during image formation, i.e., during execution of a print job. Since the separated conveyance rollers recede from the conveying path(s), such control facilitates prevention of a sheet jam in the conveying path and/or facilitates handling of an occurred jam (removal of a jammed sheet, for example).

When continuous printing is performed on one side of a plurality of sheets without performing duplex printing or additional printing, control section 100 can perform control, for example, to separate conveyance rollers 51 (51$d$ to 51$f$, 51$j$, 51$k$, and 51$m$), 84$b$, and 84$c$ disposed on first conveying path P1 as well as conveyance rollers 51 (51$g$ to 51$i$), 85$a$, and 85$b$ disposed on second conveying path P2 from the respective conveying paths P1 and P2.

Alternatively, when other sheets are not conveyed in first conveying path P1 during the above-mentioned additional printing, control section 100 may perform control to separate conveyance rollers 51 (51$d$ to 51$f$, 51$j$, 51$k$, and 51$m$), 84$b$, and 84$c$ disposed on first conveying path P1 from first conveying path P1.

Further, when duplex printing is performed on a plurality of long sheets LS as described above and after the first long sheet LS1 is ejected from sheet ejection section 52, control section 100 may perform control to separate conveyance rollers 51 (51$d$ to 51$f$, 51$j$, 51$k$, and 51$m$), 84$b$, and 84$c$ disposed on first conveying path P1 from first conveying path P1.

As in the foregoing, each embodiment can provide an image forming system and an image forming method that can prevent lowering in productivity in performing duplex printing of a long sheet.

The above-mentioned sheet feeding device 80 is in a mode in which it is connected with image forming apparatus 10 (as an image forming apparatus body) in parallel. As another configuration example, sheet feeding device 80 may be in a mode in which it is installed in the lower portion of image forming apparatus 10.

In the above-mentioned embodiments, described is a configuration in which a sheet feeding device is detachable from image forming apparatus body as an optional device, in other words, a case in which the housing of the image forming apparatus and the housing of the sheet feeding device are separate ones. As a modification of this, the housing of the image forming apparatus and the housing of the sheet feeding device may be configured as one body, in other words, a sheet feeding section and an image forming section may be configured to be stored inside one housing.

In the above-mentioned embodiments, although the image forming apparatus body is configured without including image reading section, such as a scanner or the like for reading images on originals, it may be configured including such an image reading section.

The aforementioned embodiments and modifications just describe examples of embodiments for practicing the present invention, and should not be construed as limiting the technical scope of the present invention in any way. Variations are possible without departing from the spirit or scope of the present invention.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming system including a sheet feeder that feeds a first sheet with a length in a conveying direction equal to or longer than a predetermined length and a second sheet with a length in the conveying direction shorter than the predetermined length, and an image forming apparatus including an image former that forms an image on the first sheet or the second sheet which is fed by the sheet feeder, the image forming system comprising:
   a main conveying path configured to convey the first sheet through an intermediate transfer belt and a fixing section of the image forming apparatus;
   a first conveying path defined by a first plurality of rollers that is provided inside the sheet feeder and the image forming apparatus, and that receives the first sheet directly from the main conveying path downstream of the fixing section in the conveying direction of the first sheet, reverses sides of the first sheet, and conveys the first sheet to the main conveying path upstream of the intermediate transfer belt;
   a second conveying path defined by a second plurality of rollers that is provided inside the sheet feeder and the image forming apparatus, and that receives the first sheet directly from the main conveying path downstream of the fixing section in the conveying direction of the first sheet and conveys the first sheet from downstream of the image former to the main conveying path upstream of the intermediate transfer belt without reversing the sides of the first sheet, the first conveying path and the second conveying path branching from the main conveying path downstream of the fixing section; and
   a hardware processor operably connected to the first plurality rollers and the second plurality of rollers and controls the operation thereof, that controls whether the first sheet is conveyed to the main conveying path upstream of the intermediate transfer belt via the first conveying path or via the second conveying path, when images are formed on both sides of a plurality of the first sheets by the image former, in order to narrow a space between a plurality of the first sheets.

2. The image forming system according to claim 1, wherein
   the sheet feeder includes a sheet evacuator on a downstream side of the second conveying path, and
   the hardware processor controls the first sheet to be conveyed to the main conveying path upstream of the intermediate transfer belt via the sheet evacuator when images are formed on both sides of the first sheet.

3. The image forming system according to claim 2, wherein the sheet evacuator allows a long sheet to being ejected into the sheet evacuator and is capable of being loaded with a long sheet.

4. The image forming system according to claim 1, wherein a re-feeding path is provided inside the sheet feeder, the refeeding path extending from the second conveying path to the main conveying path upstream of the intermediate transfer belt, the re-feeding path re-feeding, to the main conveying path without reversing the sides of the first sheet, the first sheet which is returned to the sheet feeder via the second conveying path.

5. The image forming system according to claim 1, wherein when the first sheet is conveyed to the main conveying path upstream of the intermediate transfer belt via the second and the first conveying paths, the hardware processor commanding the first sheet to return to the sheet feeder via the second conveying path, and then to be conveyed to the first conveying path.

6. The image forming system according to claim 1, wherein when images are formed on both sides of the second sheet by the image former, the hardware processor controls the second sheet to be conveyed to the first conveying path.

7. The image forming system according to claim 1, wherein when images are formed on both sides of the first sheet by the image former, the hardware processor controls the first sheet to be conveyed to the second conveying path.

8. The image forming system according to claim 1, wherein when images are formed on both sides of a plurality of the first sheets by the image former, the hardware processor controls the first one of the first sheets to be conveyed to the upstream side of the image former via the first conveying path, and the second and subsequent ones of the first sheets to be conveyed to the upstream side of the image former via the second and the first conveying paths.

9. The image forming system according to claim 1, wherein the second conveying path allows a middle region in a conveying direction of a long sheet to sag.

10. The image forming system according to claim 1, wherein a conveyance roller of the first and second plurality of rollers is disposed in each of the first and the second conveying paths, the conveyance roller conveying the first sheet or the second sheet and being rotatable in forward and reverse directions.

11. The image forming system according to claim 1, wherein a conveyance roller of the first and second plurality of rollers is disposed in each of the first and the second conveying paths, the conveyance roller conveying the first sheet or the second sheet and being capable of receding from the respective conveying paths.

* * * * *